UNITED STATES PATENT OFFICE.

FREDERICK WILLIAM MARTINO AND FREDERIC STUBBS, OF SHEFFIELD, ENGLAND.

PRECIPITATION OF PRECIOUS METALS FROM CYANID SOLUTIONS.

SPECIFICATION forming part of Letters Patent No. 651,509, dated June 12, 1900.

Application filed December 23, 1898. Serial No. 700,107. (No specimens.)

*To all whom it may concern:*

Be it known that we, FREDERICK WILLIAM MARTINO and FREDERIC STUBBS, subjects of the Queen of England, residing at Sheffield, York, England, have invented certain new and useful Improvements in or Relating to the Treatment of Ores and the Precipitation of Precious Metals from Their Cyanid Solutions, (for which we have made application for Letters Patent in Great Great Britain, No. 25,979, dated December 8, 1898,) of which the following is a specification.

This invention relates to the precipitation of precious metals from their cyanid solutions, its primary object being to obviate the necessity for the use of zinc in such processes.

The essential feature of this invention is the employment of acetylene or calcium carbid to effect the precipitation and is for a specific invention under the broad invention described and claimed in our application, Serial No. 709,834, filed March 20, 1899.

Acetylene is passed through a cyanid solution containing the precious metal—say gold—or calcium carbid may be added to the liquid, thus producing nascent acetylene. In either case the gold is precipitated. When acetylene is passed through the cyanid solution, its action is found to be promoted by also passing atmospheric air through the liquid.

Heat from any outside source may, if desired, be applied during any of the stages constituting this improved process. For instance, the solution may be heated before or during the treatment by passing steam through pipes immersed in it or the vessels containing the solution may be steam-jacketed.

It is assumed that the well-known cyanid process for the extraction of gold from its ores may be represented by the following equation:

$$2Au + 4KCN + O + H_2O = 2KAu(CN)_2 + 2KHO.$$

According to the present invention the following are the probable chemical reactions which take place:

I. When acetylene is passed through a cyanid solution containing gold:

(*a*) When the solution is alkaline:

$$2AuK(CN)_2 + C_2H_2 + H_2O = (Au_2OC_2H_2 + 2KCN + 2HCN) =$$
$$Au_2 + C_2H_2 + 2KCN + 2CN + H_2O.$$

In this case the precipitation of the gold is slow, owing to the fact that the free alkali (KHO) requires neutralizing by the HCN formed before precipitation of metallic gold can commence.

(*b*) When the solution is acid, the equation is the same as that given above under (*a*), but, owing to the fact that the free alkali has been already neutralized either by impurities in the ore or by the subsequent addition of an acid, the precipitation of the metallic gold occurs more rapidly than is the case with alkaline solutions.

II. When calcium carbid is added to a cyanid solution containing gold:

$$2AuK(CN)_2 + CaC_2 + 2H_2O = Au_2OC_2H_2 + 2KCN + 2HCN + CaO =$$
$$Au_2 + C_2H_2 + 2KCN + 2CN + CaOH_2O.$$

On the addition of calcium carbid to the solution of $AuK(CN)_2$ the calcium oxid formed, together with the nascent acetylene, immediately decomposes the double cyanid of gold and potassium according to the above equation and the gold is at once precipitated in a metallic state mixed with insoluble calcium oxid. The precipitates may be easily separated by the addition of acid, which will dissolve the calcium oxid and leave the metallic gold. It is found that commercial calcium carbid nearly always contains free carbon. This separates during the reactions and remains insoluble with the metallic gold after the calcium oxid is dissolved.

What we claim is—

1. A process for the precipitation of the precious metals from their aqueous cyanid solutions, consisting in treating such solutions with acetylene and precipitating the metals in a metallic state.

2. A process for the precipitation of the precious metals from their aqueous cyanid solutions, consisting in passing acetylene and atmospheric air through such solutions and precipitating the metals in a metallic state.

3. In a process for the precipitation of the precious metals from their aqueous cyanid solutions by treating such solutions with acetylene, the addition of calcium carbid to the aqueous cyanid solution in order to produce the acetylene in a nascent condition.

In testimony whereof we have hereto set our hands in the presence of the two subscribing witnesses.

FREDERICK WILLIAM MARTINO.
FREDERIC STUBBS.

Witnesses:
FRED TROTT,
THOMAS HARVEY.